United States Patent Office 3,446,811
Patented May 27, 1969

3,446,811
2-PHENOXY-2-PHENYL ACETAMIDES
Ivan C. Nordin and Robert F. Parcell, Ann Arbor, Mich., assignors to Parke, Davis & Company, Detroit, Mich., a corporation of Michigan
No Drawing. Filed Apr. 23, 1965, Ser. No. 450,510
Int. Cl. C07d *29/12;* C07c *103/30*
U.S. Cl. 260—294                 7 Claims

ABSTRACT OF THE DISCLOSURE 2-phenoxy-2-phenylacetamides substituted on the amide nitrogen by a tertiary aminoalkyl group; and acid-addition salts. The compounds have pharmacological activity as anti arrhythmic agents capable of restoring normal cardiac rhythm. The compounds can be produced by (a) reacting 2-phenoxy-2-phenylacetic acid or a reactive derivative with a tertiary aminoalkyl amine, or by (b) reacting an α-halophenylacetamide substituted on the amide nitrogen by a tertiary aminoalkyl group, with an alkali metal phenoxide.

---

The present invention relates to new organic amides. More particularly, the invention relates to new 2-phenoxy-2-phenylacetamide compounds of the formula

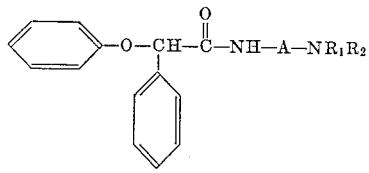

to acid-addition salts thereof, and to methods for the production of the foregoing compounds; where A represents an alkylene group of 2 to 7 carbon atoms inclusive, separating the nitrogen atoms to which it is attached by at least 2 carbon atoms; each of $R_1$ and $R_2$ represents a lower alkyl radical or a lower cycloalkyl radical, or $R_1$ and $R_2$ are combined and together represent an alkylene group of 4 to 9 carbon atoms inclusive, 4 or 5 of which carbon atoms are in annular position with the nitrogen atom to which they are attached. When $R_1$ or $R_2$ represents a lower alkyl radical, it is a lower alkyl radical of not more than 6 carbon atoms. When $R_1$ or $R_2$ represents a lower cycloalkyl radical, it is a cycloalkyl radical of not more than 6 carbon atoms. When $R_1$ and $R_2$ are combined and together represent an alkylene group, the combination —$NR_1R_2$ represents pyrrolidino, lower alkyl-substituted pyrrolidino, piperidino, or lower alkyl-substituted piperidino.

In accordance with the invention, the foregoing compounds can be produced by reacting 2-phenoxy-2-phenylacetic acid or a reactive derivative thereof with a diamine of the formula $$H_2N-A-NR_1R_2$$

where A, $R_1$ and $R_2$ are as defined before. Some examples of suitable reactive derivatives of 2-phenoxy-2-phenylacetic acid are the lower alkyl esters, the acid halides, and the amide. The preferred reactant is the free carboxylic acid or a lower alkyl ester. The carboxylic acid or its reactive derivative and the diamine are usually employed in approximately equimolar quantities, although an excess of either can be used if desired. The process can be carried out either with or without the use of a solvent. Some examples of suitable solvents are benzene, toluene, xylene, diisobutyl ether, anisole, and chlorobenzene. When the amide, or a lower alkyl ester, of 2-phenoxy-2-phenylacetic acid is used as a reactant, an excess of the diamine can be used as a solvent. The time and temperature of the reaction are not critical but nevertheless are somewhat dependent upon the particular reactants used. With the free acid, amide, or lower alkyl ester, the best yields are obtained by conducting the reaction at a temperature in excess of 100° C. or at the reflux temperature of the solvent, for from 8 to 72 hours. With the acid halide, temperatures within the range of 0–150° C. are suitable, about 50° C. being preferred, and a shorter reaction time is sufficient. When 2-phenoxy-2-phenylacetic acid is employed as a reactant best results are obtained by continuous removal of the water formed in the reaction, by means of normal or azeotropic distillation. The product is isolated either as the free base or as an acid-addition salt by adjustment of the pH as required.

Diamines required as starting materials in the foregoing process can be prepared by any of a variety of methods. For example an amine of the formula $$H-NR_1R_2$$

is reacted with a halogenated nitrile of the formula $$X-B-CN$$

and the product basified to give an aminonitrile of the formula $$H_1R_2N-B-CN$$

where $R_1$ and $R_2$ are as defined before; X represents halogen, preferably bromine; and B represents an alkylene group containing one fewer methylene units than the group A. Various aminonitriles can also be obtained by the reaction of an amine of the foregoing formula with acrylonitrile or with glycolonitrile. The aminonitrile produced by any of these methods is reduced by reaction with lithium aluminum hydride and subsequent hydrolysis to give the diamine required as starting material. These procedures as well as alternative procedures for the production of the diamines are illustrated in greater detail hereinafter.

Also in accordance with the invention, the compounds of the invention can be produced by reacting an α-haloamide of the formula

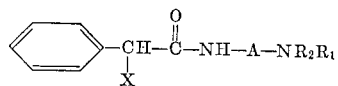

with a phenoxide of the formula

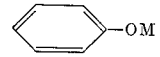

where A, $R_1$ and $R_2$ are as defined before; X represents halogen, preferably bromine; and M represents an alkali metal. Normally equimolar quantities of the reactants or up to a moderate excess of the phenoxide are used. If desired, the α-haloamide can be generated in situ by the reaction of an acid-addition salt with a strong base. Likewise the phenoxide can be generated in situ by the reaction of phenol with a strong base. A suitable strong base for such purpose is an alkali metal alkoxide. Some suitable solvents for the reaction are anhydrous lower alkanols such as methanol, ethanol, and isopropyl alcohol; ethers such as diethyl ether, diisopropyl ether, and dibutyl ether;

and hydrocarbons such as benzene, toluene, and xylene. A preferred solvent is anhydrous ethanol. The time and temperature of the reaction are not critical and it is customary to carry out the reaction at a temperature of from 50–150° C. or at the reflux temperature of the solvent for a period of from 4 to 48 hours. At the reflux temperature of ethanol a reaction time of from 12 to 20 hours is sufficient. The product is isolated either as the free base or as an acid-addition salt by adjustment of the pH as required.

The α-haloamides required as starting materials in the foregoing process can be prepared by any of a variety of methods. For example, an α-halophenylacetyl halide is reacted with a diamine of the formula

in a non-hydroxylic solvent at a temperature below 0° C. to produce a hydrohalide salt of the α-haloamide; where A, $R_1$ and $R_2$ are as defined before. This product is used as such in the foregoing process or following conversion to the free base.

The free bases of the invention form acid-addition salts with any of a variety of inorganic and organic acids. Pharmaceutically-acceptable acid-addition salts are formed by reaction with such acids ar hydrochloric, hydrobromic, sulfuric, phosphoric, acetic, succinic, citric, maleic, and pamoic acids. The acid-addition salts are converted to the free bases by reaction with a base such as sodium hydroxide, potassium carbonate, or potassium bicarbonate. The free bases and their acid-addition salts differ in solubility properties but in general are otherwise equivalent for the purposes of the invention.

The compounds of the invention are useful as pharmacological agents and as chemical intermediates. They are of particular value as anti-arrhythmic agents capable of restoring normal cardiac rhythm. Their quantitative activity can be measured in a standard laboratory test. In this standard test, dogs which undergo ligation of the anterior descending branch of the left coronary artery develop ventricular tachycardia. A compound of the invention is administered intravenously and the percent reversion to normal cardiac rhythm is measured. Complete or almost complete reversion to normal rhythm is indicative of high activity. Some of the preferred compounds of the invention are those in which the grouping —$NR_1R_2$ represents the 2,6-dimethylpiperidino radical.

The invention is illustrated by the following examples.

EXAMPLE 1

A mixture of 25.6 g. of ethyl 2-phenoxy-2-phenylacetate and 20.3 g. of 4-(2,6-dimethylpiperidino)-butylamine is heated for 24 hours at 110° C. under an air condenser. The mixture is cooled, dissolved in ether, and extracted with dilute hydrochloric acid. The acidic aqueous extract is washed with ether, made basic and extracted with benzene. The benzene extract is dried, filtered, and evaporated to give a residue of N-[4-(2,6-dimethylpiperidino)butyl]-2-phenoxy-2-phenylacetamide; M.P. 81–83° C. following crystallizations from benzene-petroleum ether.

EXAMPLE 2

A mixture of 25.6 g. of ethyl 2-phenoxy-2-phenylacetate and 19.8 g. of 5-(2,6-dimethylpiperidino)-pentylamine is heated at a bath temperature of 150–160° C. for 22 hours under an air condenser. The reaction mixture is cooled, dissolved in toluene, and extracted with dilute hydrochloric acid. The acidic aqueous extract is made strongly basic with sodium hydroxide and extracted with toluene. The toluene extract is dried, filtered, and evaporated under reduced pressure to give a residue of N-[5-(2,6-dimethylpiperidino)pentyl]-2-phenoxy-2 - phenylacetamide; M.P. 100–102° C. following crystallization from toluene-petroleum ether.

EXAMPLE 3

A mixture of 51.2 g. of ethyl 2-phenoxy-2-phenylacetate and 37.4 g. of 3-(2,6-dimethylpiperidino)-propylamine is heated at a bath temperature of 150–160° C. for 22 hours under an air condenser. The reaction product is N-[3-(2,6-dimethylpiperidino)propyl]-2-phenoxy - 2 - phenylacetamide; M.P. 95–97.5° C. following crystallization from benzene-petroleum ether.

EXAMPLE 4

A mixture of 59.2 g. of ethyl 2-phenoxy-2-phenylacetate and 55 g. of 6-(2,6-dimethylpiperidino)-hexylamine is heated at 110° C. for 28 hours under an air condenser. The reaction mixture is distilled in vacuo and the fraction of N-[6-(2,6-dimethylpiperidino) - hexyl]-2-phenoxy-2-phenylacetamide is collected; B.P. 225.5–228° C. at 0.16 mm.

By the foregoing general procedure the following additional products are obtained.

From 51.2 g. of ethyl 2-phenoxy-2-phenylacetate and 34.4 g. of 3-(2,5-dimethylpyrrolidino)propylamine, the product is N-[3-(2,5-dimethylpyrrolidino)propyl]-2-phenoxy-2-phenylacetamide; B.P. 206–208° C. at 0.15 mm.; M.P. 63–65.5° C.

From 38.4 g. of ethyl 2-phenoxy-2-phenylacetate and 29.7 g. of 3-(cyclohexylisopropylamino)propylamine, the product is N - [3-(cyclohexylisopropylamino)propyl] - 2-phenoxy-2-phenylacetamide; B.P. 225–226.5° C. at 0.25 mm.

From 25.6 g. of ethyl 2-phenoxy-2-phenylacetate and 19.8 g. of 3-(2,2,4,6-tetramethylpiperidino)propylamine, the product is N-[3-(2,2,4,6-tetramethylpiperidino)propyl]-2-phenoxy-2-phenylacetamide; B.P. 221–222° C. at 0.25 mm.

From 25.6 g. of ethyl 2-phenoxy-2-phenylacetate and 18.7 g. of 3-(2-ethylpiperidino)propylamine, the product is N - [3 - (2-ethylpiperidino)propyl]-2-phenoxy-2-phenylacetamide; B.P. 212–213° C. at 0.1 mm.

From 25.6 g. of ethyl 2-phenoxy-2-phenylacetate and 15.6 g. of 3-(2-methylpiperidino)propylamine, the product is N - [3-(2-methylpiperidino)propyl]-2-phenoxy-2-phenylacetamide; B.P. 196.5–198° C. at 0.1 mm.

From 25.6 g. of ethyl 2-phenoxy-2-phenylacetate and 24.9 g. of 7-(2,6-dimethylpiperidino)heptylamine, the product is N - [7-(2,6-dimethylpiperidino)heptyl]-2-phenoxy-2-phenylacetamide; M.P. 84–85.5° C.

From 25.6 g. of ethyl 2-phenoxy-2-phenylacetate and 16 g. of 4-(diisopropylamino)butylamine, the product is N - [4 - (diisopropylamino)butyl] - 2 - phenoxy - 2 - phenylacetamide; B.P. 203–205° C. at 0.11 mm.; M.P. 52–55° C.

From 25.6 g. of ethyl 2-phenoxy-2-phenylacetate and 18.4 g. of 3-(5-ethyl-2-methylpiperidino)propylamine, the product is N - [3-(5-ethyl-2-methylpiperidino)propyl]-2-phenoxy-2-phenylacetamide; B.P. 201–202° C. at 0.1 mm.

From 35.8 g. of ethyl 2-phenoxy-2-phenylacetate and 25.9 g. of 4-(2-ethylpiperidino)butylamine, the product is N - [4 - (2 - ethylpiperidino)butyl] - 2 - phenoxy - 2-phenylacetamide; B.P. 213° C. at 0.15 mm.

From 25.6 g. of ethyl 2-phenoxy-2-phenylacetate and 21.2 g. of 5 - (2,6 - dimethylpiperidino) - 3 - methylpentylamine, the product is N-[5-(2,6-dimethylpiperidino)-3-methylpentyl]-2-phenoxy-2-phenylacetamide; B.P. 220° C. at 0.15 mm.

Each of the foregoing free bases is converted to a hydrochloride by treating an ethereal solution of the free base with dry hydrogen chloride. A sulfate is obtained by reacting the free base with sulfuric acid. A citrate is obtained by mixing methanolic solutions of the free base and citric acid and concentrating to a small volume.

EXAMPLE 5

A stirred solution of 45.6 g. of 2-phenoxy-2-phenylacetic acid and 31.7 g. of 2-(diisopropylamino)-ethylamine in 500 ml. of xylene is heated under reflux for 16 hours, with continuous removal of the water formed in the reaction. The mixture is cooled and extracted with dilute hydrochloric acid. The acidic aqueous extract is washed with ether and made strongly basic with sodium hydroxide. The insoluble product which separates is extracted with ether and the ether solution is dried, filtered, and evaporated to give a residue of N-[2-(diisopropylamino)-ethyl]-2-phenoxy-2-phenylacetamide; B.P. 172–175° C. at 0.05 mm. The hydrochloride is obtained by adding hydrogen chloride to a solution of the free base in ether; M.P. 159–161° C. following crystallization from isopropyl alcohol-petroleum ether.

By the foregoing general procedure, the following additional products are obtained. The quantity of xylene or other reaction solvent is adjusted as necessary to give a complete solution.

From 45.6 g. of 2-phenoxy-2-phenylacetic acid and 34.6 g. of 3-(diisopropylamino)propylamine, the product is N - [3-(diisopropylamino)propyl]-2-phenoxy-2-phenylacetamide; B.P. 202–204° C. at 0.22 mm.

From 45.6 g. of 2-phenoxy-2-phenylacetic acid and 26 g. of 3-(diethylamino)propylamine, the product is N-[3 - (diethylamino)propyl]-2-phenoxy-2-phenylacetamide; B.P. 181–182° C. at 0.2 mm.

From 45.6 g. of 2-phenoxy-2-phenylacetic acid and 25.6 g. of 3-(piperidino)propylamine, the product is N-[3 - (piperidino)propyl] - 2 - phenoxy - 2 - phenylacetamide; M.P. 62–64° C.

From 46 g. of 2-phenoxy-2-phenylacetic acid and 32 g. of 3-(dimethylamino)propylamine, the product is N-[3 - (dimethylamino)propyl] - 2 - phenoxy - 2 - phenylacetamide. The hydrochloride, prepared by the addition of hydrogen chloride to a solution of the free base in ether, has M.P. 148–149° C.

From 45.6 g. of 2-phenoxy-2-phenylacetic acid and 23.2 g. of 2-(diethylamino)ethylamine, the product is N-[2 - (diethylamino)ethyl] - 2 - phenoxy - 2 - phenylacetamide; B.P. 169–170° C. at 0.1 mm.

From 45.6 g. of 2-phenoxy-2-phenylacetic acid and 34.3 g. of 2-(2,6-dimethylpiperidino)ethylamine, the product is N - [2 - (2,6 - dimethylpiperidino)ethyl] - 2 - phenoxy-2-phenylacetamide; M.P. 117–119° C.

From 45.6 g. of 2-phenoxy-2-phenylacetic acid and 24.8 g. of 3-(pyrrolidino)propylamine, the product is N-[3 - (pyrrolidino)propyl] - 2 - phenoxy - 2 - phenylacetamide; M.P. 63–64° C.

From 45.6 g. of 2-phenoxy-2-phenylacetic acid and 25.6 g. of 2-(piperidino)ethylamine, the product is N-[2-(piperidino)ethyl]-2-phenoxy - 2 - phenylacetamide; M.P. 62–64° C.

From 45.6 g. of 2-phenoxy-2-phenylacetic acid and 30 g. of 2-(dimethylamino)ethylamine, the product is N-[2 - (dimethylamino) - 2 - phenoxy - 2 - phenylacetamide; M.P. 101–102° C.

From 11 g. of 2-phenoxy-2-phenylacetic acid and 10 g. of 4-(2,6-diethylpiperidino)butylamine, the product is N-[4 - (2,6 - diethylpiperidino)butyl] - 2 - phenoxy - 2-phenylacetamide; B.P. 215–220° C. at 0.3 mm.

EXAMPLE 6

With stirring, 41.8 g. of N-[4-(2,6-dimethylpiperidino)butyl]-2-bromo-2-phenylacetamide hydrochloride is added to a solution of 10.8 g. of sodium methoxide and 9.4 g. of phenol in 500 ml. of absolute ethanol. The reaction mixture is heated under reflux for 18 hours and then cooled and filtered. The filtrate is evaporated under reduced pressure to give a residue of N-[4-(2,6-dimethylpiperidino)butyl]-2-phenoxy-2-phenylacetamide. For purification the residue is extracted with ether. The ether extract is washed with water, dried, and evaporated and the residue is crystallized from benzene-petroleum ether; M.P. 81–83° C.

By the foregoing procedure, with the substitution of 43.2 g. of N-[5-(2,6-dimethylpiperidino)pentyl]-2-bromo-2-phenylacetamide hydrochloride for the N-[4-(2,6-dimethylpiperidino)butyl]-2-bromo-2-phenylacetamide hydrochloride, the product obtained is N-[5-(2,6-dimethylpiperidino)pentyl] - 2 - phenoxy-2-phenylacetamide; M.P. 100–102° C.

The starting materials can be obtained as follows. With stirring and external cooling to −10° C., 18.4 g. of 4-(2,6-dimethylpiperidino)butylamine is added to a solution of 23.4 g. of 2-bromo-2-phenylacetyl chloride in 200 ml. of carbon tetrachloride. The mixture is allowed to warm to room temperature and is then evaporated under reduced pressure to leave a residue of N-[4-(2,6-dimethylpiperidino)butyl]-2-bromo-2-phenylacetamide hydrochloride, suitable for use without further purification. By the same procedure, 5-(2,6-dimethylpiperidino)pentylamine and 2-bromo-2-phenylacetyl chloride are reacted to produce N-[5-(2,6-dimethylpiperidino)pentyl] - 2 - bromo-2-phenylacetamide hydrochloride.

Starting materials

A solution of 148 g. of 4-bromobutyronitrile and 226 g. of 2,6-dimethylpiperidine in 400 ml. of toluene is heated under reflux for 5 hours. The reaction mixture is cooled and made slightly acidic with dilute hydrochloric acid. The aqueous layer is separated, made basic with sodium hydroxide solution, and extracted with ether. The ether extract is dried and evaporated to give a residue of 4-(2,6-dimethylpiperidino)butyronitrile; B.P. 140–150° C. at 14 mm. By the same general procedure, the following additional aminonitriles are obtained.

5-(2,6-dimethylpiperidino)valeronitrile; B.P. 164–166° C. at 20 mm.

6-(2,6-dimethylpiperidino)capronitrile; B.P. 169–172° C. at 16 mm.

7-(2,6-dimethylpiperidino)enanthonitrile; B.P. 179–189° C. at 17 mm.

4-(diisopropylamino)butyronitrile; B.P. 97–103° C. at 17 mm.

4-(2-ethylpiperidino)butyronitrile; B.P. 138–142° C. at 12 mm.

4-(2,6-diethylpiperidino)butyronitrile; B.P. 145–149° C. at 8 mm.

A mixture of 100 g. of 2,5-dimethylpyrrolidine, 107 g. of acrylonitrile, 4 ml. of water, and 45 g. of formamide is heated under reflux for 10 hours, and excess acrylonitrile is removed by distillation under reduced pressure. The mixture is diluted with ether and washed with water and the ether phase is dried, filtered, and evaporated to give a residue of 3-(2,5-dimethylpyrrolidino)propionitrile; B.P. 98–100° C. at 11 mm. In a similar manner the following additional aminonitriles are obtained.

3-(cyclohexylisopropylamino)propionitrile; B.P. 141–143° C. at 9 mm.

3-(2,2,4,6-tetramethylpiperidino)propionitrile; B.P. 130–131° C. at 8 mm.

3-(2-ethylpiperidino)propionitrile, B.P. 131–132° C. at 12 mm.

3-(5-ethyl-2-methylpiperidino)propionitrile; B.P. 78–80° C. at 0.15 mm.

With external cooling, 226 g. of 2,6-dimethylpiperidine is added dropwise to 187 ml. of 70% aqueous glycolonitrile. The mixture is heated to 70° C. then cooled, diluted with ether, and washed with water. The ether phase is separated, dried, filtered, and evaporated to give a residue of 2-(2,6-dimethylpiperidino)acetonitrile; B.P. 103–105° C. at 14 mm.

With stirring, 121 g. of 4-(2,6-dimethylpiperidino)butyronitrile is added dropwise to 25.5 g. of lithium aluminum hydride in 2000 ml. of ether. The reaction mixture is then heated under reflux for 2 hours and diluted with 27 ml. of water, 20 ml. of 20% aqueous sodium hydroxide, and 90 ml. of water, added in that order. The insoluble material is removed by filtration and the filtrate is evaporated under reduced pressure to give a residue of 4-(2,6-dimethylpiperidino)butylamine; B.P. 130–134° C., at 16 mm. In a similar manner the following additional diamines are obtained.

5-(2,6-dimethylpiperidino)pentylamine; B.P. 86–88° C. at 0.25 mm.
6-(2,6-dimethylpiperidino)hexylamine; B.P. 159–164° C. at 20 mm.
3-(2,5-dimethylpyrrolidino)propylamine; B.P. 81–83° C. at 10 mm.
3-(cyclohexylisopropylamino)propylamine; B.P. 124–127° C. at 9 mm.
3-(2,2,4,6-tetramethylpiperidino)propylamine; B.P. 121–122° C. at 8 mm.
3-(2-ethylpiperidino)propylamine; B.P. 113–115° C. at 12 mm.
7-(2,6-dimethylpiperidino)heptylamine; B.P. 92–94° C. at 0.16 mm.
4-(diisopropylamino)butylamine; B.P. 97–107° C. at 17 mm.
3-(5-ethyl-2-methylpiperidino)propylamine; B.P. 122–123.5° C. at 40 mm.
2-(2,6-dimethylpiperidino)ethylamine; B.P. 99–105° C. at 14 mm.
4-(2-ethylpiperidino)butylamine; B.P. 126–127° C. at 12 mm.
4-(2,6-diethylpiperidino)butylamine; B.P. 134–136° C. at 8 mm.

Phosphorus pentachloride, 180 g., is gradually added to 239 g. of molten N-benzoyl-4-methylpiperidine. After the reaction moderates an additional 90 g. of phosphorus pentachloride is added. The mixture is heated under reflux for 1 hour, cooled, poured onto 1500 g. of ice, and extracted with ether. The ether extract is washed with water and with cold 3% sodium hydroxide solution and is then dried, stirred with activated charcoal, filtered, and evaporated to give a residue of N-(5-chloro-3-methylpentyl)benzamide. 2,6-dimethylpiperidine, 400 ml., is added to the residue and the mixture heated under reflux for 50 hours. Excess 2,6-dimethylpiperidine is removed under reduced pressure and the residue is dissolved in dilute hydrochloric acid. The aqueous solution is washed with ether, made strongly basic with sodium hydroxide solution, and extracted with ether. The ether extract is dried and evaporated to give a residue of crude amide. This product is dissolved in 500 ml. of 6 N hydrochloric acid and the mixture heated under reflux for 20 hours and then cooled. A quantity of crystalline material is collected. The aqueous solution is washed with ether and then made strongly basic with sodium hydroxide. The insoluble product is extracted with ether and the ether extract dried, filtered, and evaporated to give a residue of 5-(2,6-dimethylpiperidino)-3-methylpentylamine; B.P. 78–78.5° C. at 0.1 mm.

Hydrazine hydrate, 500 ml., is added to a solution of 81.5 g. of 2,6-diacetylpyridine in 500 ml. of ethanol at 50° C. The resulting solution is heated under partial reflux with distillation of ethanol until the heating bath reaches a temperature of 105° C. The mixture is diluted with 1000 ml. of water and cooled to 4° C. The insoluble 2,6-diacetylpyridine dihydrazone is collected, washed with ice water, and dried in vacuo at 80° C.; M.P. 185–194° C. A mixture of 74.5 g. of this product and 88 g. of potassium t-butoxide in 800 ml. of toluene is heated under reflux for 1 hour. The reaction mixture is cooled, washed with dilute sodium hydroxide solution and extracted with dilute hydrochloric acid. The aqueous acidic extract is made basic with sodium hydroxide and extracted with ether. The ether extract is dried and evaporated to give a residue of 2,6-diethylpyridine; B.P. 64–67° C. at 14 mm. A solution of 50 g. of this product in 400 ml. of methanol with 5 g. of 10% ruthenium on carbon catalyst is shaken in a hydrogen atmosphere at 2000 pounds per square inch pressure until the calculated amount of hydrogen has been absorbed. The mixture is filtered and the filtrate distilled to give a residue of 2,6-diethylpiperidine; B.P. 52–54° C. at 9 mm.

What is claimed is:
1. A member of the class consisting of compounds of the formula

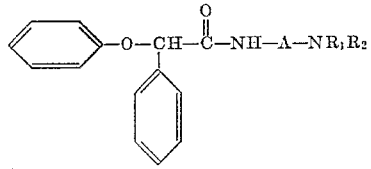

and pharmaceutically-acceptable acid-addition salts thereof; where A is an alkylene group of 2 to 7 carbon atoms inclusive, separating the nitrogen atoms to which it is attached by at least 2 carbon atoms; $R_1$ and $R_2$ individually are members of the class consisting of lower alkyl and lower cycloalkyl; and $R_1$ and $R_2$ in combination represent an alkylene group of 4 to 9 carbon atoms inclusive, selected from the class consisting of tetramethylene, lower alkyl-substituted tetramethylene, pentamethylene, and lower alkyl-substituted pentamethylene.

2. A compound of the formula

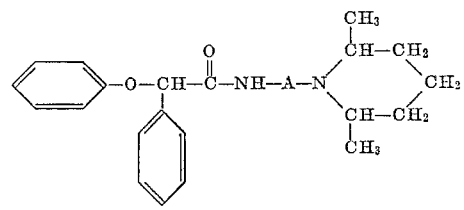

where A is an alkylene group of 2 to 7 carbon atoms inclusive, separating the nitrogen atoms to which it is attached by at least 2 carbon atoms.

3. N - [3-(2,6-dimethylpiperidino)propyl] - 2 - phenoxy-2-phenylacetamide.
4. N - [4-(2,6-dimethylpiperidino)butyl] - 2 - phenoxy-2-phenylacetamide.
5. N - [5 - (2,6 - dimethylpiperidino)pentyl] - 2 - phenoxy-2-phenylacetamide.
6. N - [6-(2,6-dimethylpiperidino)hexyl] - 2 - phenoxy-2-phenylacetamide.
7. A pharmaceutically-acceptable acid-addition salt of a compound of the formula

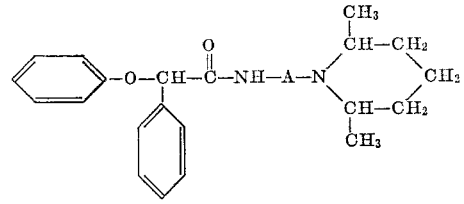

where A is an alkylene group of 2 to 7 carbon atoms inclusive, separating the nitrogen atoms to which it is attached by at least 2 carbon atoms.

References Cited

UNITED STATES PATENTS

| | | | |
|---|---|---|---|
| 2,428,978 | 10/1947 | Martin et al. | 260—559 |
| 2,715,645 | 8/1955 | Cusic | 260—294 |
| 2,932,645 | 4/1960 | Sumerford et al. | 260—294 |
| 2,965,638 | 12/1960 | Schindler et al. | 260—294 |
| 3,051,706 | 12/1962 | Suter et al. | 260—294 |
| 3,106,564 | 10/1963 | Fleming et al. | 260—326.5 |
| 3,141,757 | 7/1964 | Metiwier et al. | 260—294 |
| 3,239,520 | 3/1966 | Proosdy-Hartzema et al. | 260—294 |

HENRY R. JILES, Primary Examiner.

E. D. LEWIS, Assistant Examiner.

U.S. Cl. X.R.

167—55, 65; 260—293.2, 326.3, 326.85, 559